Dec. 20, 1960  G. M. NAUL  2,965,220
SPINNING BUCKET
Filed Feb. 13, 1958
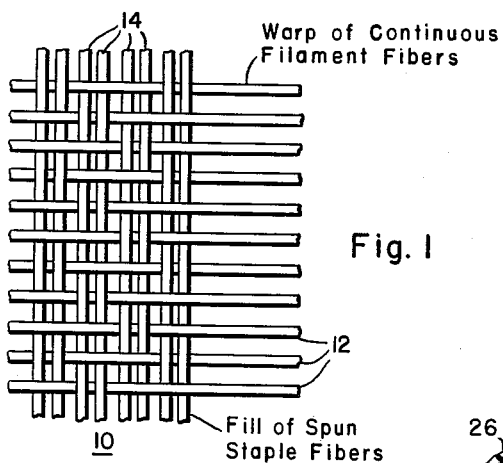
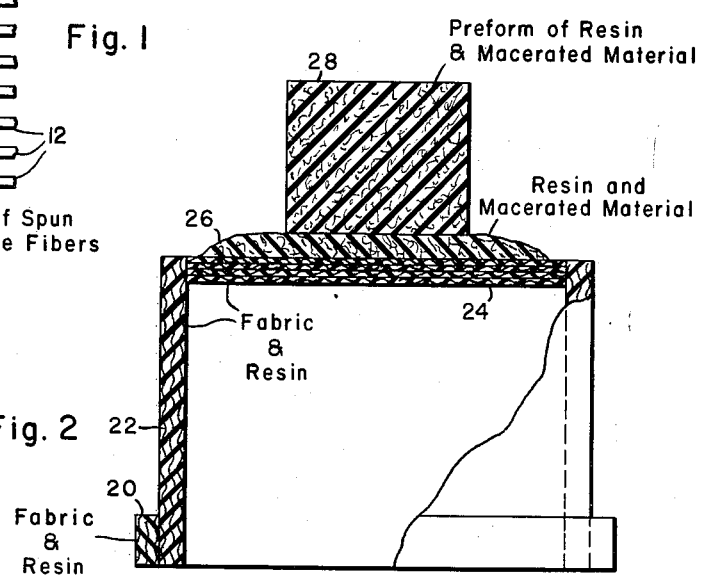
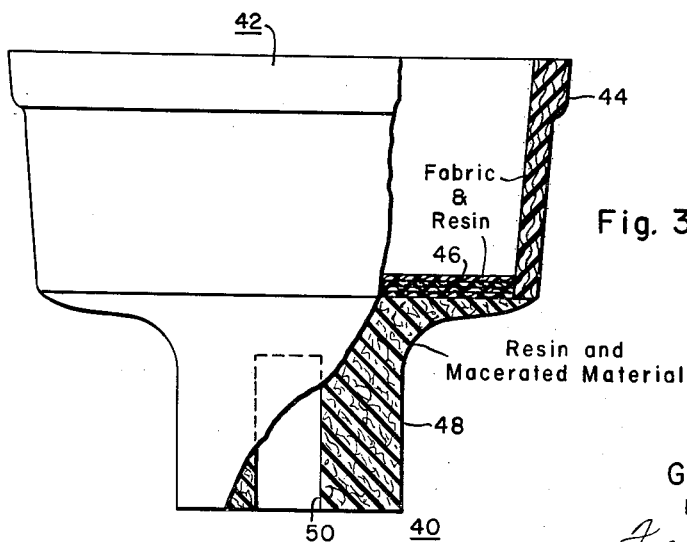
INVENTOR
George M. Naul
BY
Frederick A. Lapre
ATTORNEY

United States Patent Office 2,965,220
Patented Dec. 20, 1960

2,965,220

SPINNING BUCKET

George M. Naul, Hampton, S.C., assignor to Westinghouse Electric Corporation, East Pittsburgh, Pa., a corporation of Pennsylvania Filed Feb. 13, 1958, Ser. No. 715,128

4 Claims. (Cl. 206—2)

This invention relates to high strength spinning buckets for use in the manufacture of rayon, and in particular to high strength spinning buckets that are resistant to acids.

In the manufacture of rayon, spinning buckets are used for collection of the rayon filament and for the separation from the filament by centrifugal force, of the carry-over from the coagulating bath. The carry-over comprises primarily dilute sulfuric acid.

Molded plastic spinning buckets now in use usually comprise a cellulosic fabric material impregnated and bonded together with a phenolic resin. Often stainless steel wire reinforcements are molded into the bucket to render the bucket capable of withstanding the high centrifugal forces developed in service. These spinning bucket materials do not have as good resistance to the corrosive action of dilute sulfuric acid as is desired and the bucket will eventually become weakened during service and fail.

It is desirable to have available in the art a molded plastic spinning bucket composed of a specific synthetic resin fabric and an epoxy base resin capable of withstanding the centrifugal forces developed in service and capable of better withstanding the corrosive action of dilute sulfuric acid.

The object of this invention is to provide a highly acid resistant spinning bucket capable of withstanding high stresses in a circumferential direction, which spinning bucket comprises molded layers of an acid resistant synthetic resin fabric and an acid resistant resinous composition impregnating and bonding the layers of fabric together.

Other objects of this invention will, in part, be obvious and will, in part, appear hereinafter. For a better understanding of the nature and the objects of the invention, reference should be had to the following detailed description and drawing, in which:

Figure 1 is a plan view of fabric construction for use in this invention;

Fig. 2 is a view in cross-section of the arrangement of prepared components prior to molding into a spinning bucket; and Fig. 3 is a side elevation, partly in section, of a molded spinning bucket.

In accordance with this invention a highly acid resistant molded spinning bucket capable of withstanding high stresses in a circumferential direction is prepared which spinning bucket comprises a plurality of layers of a high strength acid resistant synthetic fabric of a specific construction and a thermoset epoxy base resin impregnating and bonding the layers of the fabric.

The fabric employed in carrying out this invention is one fabricated from high strength synthetic resin fibers that have good resistance to acids. Examples of suitable synthetic resin fibers are polymers of acrylonitrile, such as those available commercially under the proprietary names Orlon and Acrilan; copolymers of vinyl chloride and acrylonitrile, available commercially under the proprietary name dynel, and polyethylene terephthalate, available commercially under the proprietary name Dacron. It will be understood that the fabric may comprise mixtures of two or more of the acid resistant synthetic resin fibers.

In accordance with this invention, the fabric employed comprises warp of continuous filament yarn and fill of staple yarn. The continuous filament warp yarn provides for high strength, and is constructed so as to have a minimum of twist. The fabric is so disposed that the continuous filament warp fibers are disposed substantially circumferentially of the body of the spinning bucket. The fill of staple yarn provides high bond strength between the layers of fabric and the thermoset epoxy resin. Various fabric weaves may be employed to attain this result.

Epoxy base resins are particularly well suited for preparing the spinning buckets of this invention owing to the fact that they possess good resistance to attack by acids. Exceptional results have been obtained by employing epoxylated phenolic novolac resins in preparing the spinning buckets of this invention.

The resinous polymeric epoxides, also known as glycidyl polyethers, employed as the impregnating and bonding resin in this invention may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such for example as 4,4'-dihydroxy-diphenyl-dimethyl-methane (referred to hereinafter as bisphenol "A") and 4,4'-dihydroxy-diphenyl-methane. In admixture with the named polynuclear phenols, use also may be made of those polynuclear phenols wherein the phenol nuclei are joined by sulfur bridges such, for example, as 4,4'-dihydroxy-diphenyl-sulfone.

While it is preferred to use epichlorohydrin as the epihalohydrin in the preparation of the resinous polymeric epoxide starting materials of the present invention, other epihalohydrins, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide, or glycidyl polyether of a dihydric phenol, suitable for use in this invention has a 1,2-epoxy equivalency greater than 1.0. By epoxy equivalency reference is made to the number of 1,2-epoxy groups

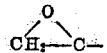

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers thus is a value between 1.0 and 2.0. In other cases the epoxide equivalency is given in terms of epoxide equivalents in 100 grams of the resin, and this may vary from about 0.08 to 0.70. Also, epoxide equivalent is often expressed as the number of grams of resin containing one equivalent of epoxide.

Resinous polymeric epoxides or glycidyl polyethers suitable for use in accordance with this invention may be prepared by admixing and reacting from one mole to two moles proportions of epihalohydrin, preferably epichlorohydrin, with about one mole proportion of bisphenol "A" in the presence of at least a stoichiometric excess of alkali based on the amount of halogen.

To prepare the resinous polymeric epoxides, aqueous alkali, bisphenol "A" and epichlorohydrin are introduced into and admixed in a reaction vessel. The aqueous alkali serves to dissolve the bisphenol "A" with the formation of the alkali salts thereof. If desired, the aqueous alkali and bisphenol "A" may be admixed first and then the epichlorohydrin added thereto, or an aqueous solution of alkali and bisphenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali. The resulting epoxy resins may be liquid or solid at room temperature. The solid resins are dissolved in a volatile solvent to form solutions with which the high strength acid resistant fabric is treated.

A suitable catalyst is added to the epoxy resin or solution thereof to provide a resinous composition that will thermoset. The reactive epoxy resins may be admixed with various amines, such, for example, as metaphenylenediamine or dicyandiamide, or triethanolamine borate, or urea-formaldehyde reaction products, or other catalysts well known in the art. It is desirable to employ a catalyst that, after mixing with the epoxy resin, will produce a resinous composition having good shelf life. A particularly good catalyst for this purpose is boron trifluoride-ethylamine complex.

The following example illustrates the preparation of a glycidyl polyether of a dihydric phenol suitable for use in this invention.

Example I

Fifty-four parts of sodium hydroxide are dissolved in about 600 parts of water in an open kettle provided with a mechanical stirrer. Six hundred eighty-four parts, about 3 moles, of bisphenol "A" are added and the resultant mixture is stirred for about 10 minutes at a temperature of about 30° C. Thereafter, 370 parts, approximately 4 moles, of epichlorohydrin are added, whereupon the temperature of the resultant mixture increases to about 60° C. to 70° C. due to the heat of reaction. About 42 parts of caustic soda dissolved in about 9 parts of water then are added with continuous stirring and the mixture is maintained at a temperature of about 90° C. to 100° C. for a period of about one hour. The mixture then is permitted to separate into two layers. The upper layer is withdrawn and discarded and the lower layer is washed with boiling water to which is added acetic acid in an amount sufficient to neutralize unreacted caustic soda. A liquid resinous reactive polymeric epoxide is obtained after substantially all of the wash water has been removed.

Another thermosettable epoxy resin that has been found to be highly satisfactory in the preparation of the spinning buckets of this invention is that derived from the reaction of a thermoplastic phenolic novolac and a haloepoxy alkane such for example as the epihalohydrins. These resinous compositions are often referred to as epoxylated phenolic novolac resins.

The epoxylated phenolic novolac type resins are prepared by condensing an epihalohydrin, such as epichlorohydrin, with a phenolic novolac resin. The condensation is effected by mixing the novolac resin with at least about 3 mols of epichlorohydrin per phenolic hydroxyl equivalent of novolac resin and with addition of about one mol of alkali metal hydroxide per phenolic hydroxyl equivalent of novolac resin. The reaction mixture is maintained within the range of about 60° to 150° C. during the reaction. Upon completion of the reaction, the resulting epoxylated phenolic novolac resin is separated from the reaction mixture and purified by washing and conventional means.

The phenolic novolac resins employed are well known and many of them are available as commercial products. The novolac resins are generally obtained by reacting phenol and an aldehyde such, for example, as formaldehyde, in a molar ratio such that the phenol is present in a molar excess over the formaldehyde. Usually, acid catalysts are employed in the reaction, but certain alkaline catalysts may also be used. Thus, such novolac resins may be prepared by reacting, for example, from 1.2 to 2.0 or more mols of phenol per mol of formaldehyde, using an acid catalyst such as sulfuric acid. The mixture of ingredients is generally heated to reflux and refluxed for a period of time varying from about one hour to four hours. At the end of the reflux period the resinous composition is dehydrated until about 85 percent of the water is removed. Thereafter, the acid present is usually neutralized by the addition of an alkaline material such as hydrated lime.

Although it is generally preferred to use formaldehyde as the condensing agent in the preparation of phenolic novolacs, other aldehydes such, for example, as acetaldehyde, propionaldehyde, butyraldehyde, heptaldehyde, benzaldehyde and furfuraldehyde may be employed.

Examples of suitable phenols that may be employed in preparing the phenolic novolac are phenol, metacresol, ortho-cresol, para-cresol, ortho-ethyl phenol, para-ethyl phenol, ortho-isopropyl phenol, butyl phenol, tertiary butyl phenol, tertiary amyl phenol and nonyl phenol.

The following specific example illustrates the preparation of an epoxylated phenolic novolac resin suitable for use in this invention. Parts given are by weight.

Example II

The following ingredients are placed in a reaction vessel fitted with a thermometer, stirrer and reflux column:

| | |
|---|---|
| Phenol | 1138 parts (12 mols). |
| Formaldehyde (37%) | 810 parts (10 mols). |
| Sulfuric acid | 3.6 parts in 50 parts of water. |

The ingredients are heated slowly, with stirring, until a temperature of about 75° C. is reached. At this point an exothermic reaction occurs and the temperature of the mixture increases to about 97° C. Cooling is necessary at this point to control the reaction. After the exothermic reaction has subsided, the mixture is refluxed for about three hours. The reaction product is washed with hot water and most of the unreacted phenol is removed by steam distillation. The resin is dehydrated by distillation to a final temperature of about 120° C. at 5 mm. of Hg so as to obtain about 1085 parts of phenolic novolac resin.

An epoxylated phenolic resin is prepared from 306 parts (about 3 equivalents) of the phenolic novolac resin, 1380 parts (about 10 mols) of epichlorohydrin, and 7.5 parts of water with addition of 123 parts (about 3 mols) of sodium hydroxide being made in about six equal portions at 10 minute intervals while maintaining the temperature at about 95° C. to 100° C. The formed resin is removed in usual manner with removal of the excess epichlorohydrin by distillation, precipitation of the salt with benzene, and separation of the benzene from the resin by distillation whereby about 446 parts of epoxylated phenolic novolac resin are obtained. The obtained resin has a Durran's softening point of 27° C., a molecular weight of about 530, an epoxy value of 0.537 equivalents per 100 grams of resin, and an alcoholic hydroxyl value of 0.09 equivalents per 100 grams of resin.

Other epoxylated phenolic novolac resins that may be employed in carrying out this invention are those that have a molecular weight of about 610 and an average of 3.2 epoxy groups per molecule, and those that have a molecular weight of about 485 and an average of 2.6 epoxy groups per molecule.

For a more complete description of epoxylated phenolic novolac resins and their method of preparation reference is made to U.S. Patents 2,658,885 to D'Alelio and 2,716,099 to Bradley et al.

The resinous epoxy compositions employed in this invention may be dissolved in a volatile solvent to produce a satisfactory low viscosity impregnating composition. Approximately 6% by weight of a curing agent, such as dicyandiamide, or 8% by weight of meta phenylene diamine is added to provide a resinous composition that will cure to a thermoset solid state on heating to 130°–160° C. Solvent can be evaporated from the treated cloth.

Examples of other suitable glycidyl polyethers that may be employed in carrying out this invention are those set forth in U.S. Patent No. 2,643,243.

Various other epoxy resins will give good results. Thus, the following may be used with success.

Example III

An epoxide resin having a melting point of 97–103° C., and an epoxide equivalency of 0.11 to 0.12 per 100 grams of resin, and a 40% solution in diethylene glycol monobutyl ether has a viscosity of R–T on the Gardner-Holdt scale.

Example IV

An epoxide resin having a melting point of 64–67° C., an epoxide equivalency of from 0.19 to 0.20 per 100 grams of resin and a 40% solution in diethylene glycol monobutyl ether has a viscosity of C–G on the Gardner-Holdt scale.

The epoxy resins are dissolved in a suitable solvent such as isopropanol, ethanol, methylethylketone, toluol or mixtures of two or more to provide an impregnating varnish having a resin solids content or from about 40% to 50%.

The following example is illustrative of a suitable resinous varnish composition for use in this invention.

Example V

| | Parts by weight |
|---|---|
| Epoxylated phenolic novolac resin of Example II | 12 |
| Toluol | 3.6 |
| Isopropanol | 1.8 |
| Methylethylketone | 1.8 |
| Boron trifluoride ethylamine complex (catalyst) | 0.15 |

The above ingredients are thoroughly admixed to provide a varnish composition having a resin solids content of about 47% and a viscosity of about 80 centipoises at 25° C.

The acid resistant fabric employed in this invention is dipped in the resinous varnish composition one or more times until it has picked up resin solids in an amount of from 1.2 to 1.5 times the weight of the dry fabric and the varnish impregnated fabric is passed through an oven or other dryer after each dip to remove the volatile solvent. During drying, it is desirable to heat the fibrous material treated with the varnish composition at a temperature of from 110° C. to 150° C. for a brief period in order to remove the solvent therefrom promptly and to advance the cure of the resin well into the "B" stage. The heat treatment of the applied epoxy resin at this stage is conducted so that the resulting treated fabric has a "greenness" of from 12% to 16%. The greenness is determined by placing approximately 15 grams of the resin treated sheet material in a hot press at a temperature of 175° C. and a pressure of 1000 pounds per square inch for 5 minutes, and then measuring the amount of resin that is forced out of the sample, that is, the resin that extends beyond the fibrous sheet material proper, and determining the proportion of this exuded resin to the total weight of the sample.

Example VI

An example of an acid resistant fabric that is suitable for use in carrying out this invention is one made from polyethylene terephthalate fibers and one that has the following characteristics.

| | |
|---|---|
| Weave | 1 x 2 flat weave with 2 fills woven together. |
| Weight, oz. per sq. yd. | 6.15. |
| Warp yarn | Continuous filaments fibers. |
| Fill yarn | Spun staple fibers. |
| Warp yarns per inch | 22 |
| Fill yarns per inch | 50 |
| Tensile strength by the grab method | 317 pounds x 170 pounds. |
| Thickness | 10 mils. |

This fabric is available commercially from the Wellington Sears Company. There is shown in Fig. 1 of the drawing a fabric 10 of the above construction. The warp yarns 12 comprise continuous filament fibers and the fill yarns 14 comprise staple fibers. All fibers are prepared from acid resistant synthetic resin.

The following example illustrates a method of preparing a spinning bucket in accordance with this invention.

Example VII

The fabric of Example VI is impregnated with the resinous varnish composition of Example V and the solvent removed. The fabric is provided with resin in an amount equal to 1.3 times the weight of the fabric and a greenness of about 14%.

Two tubular members are prepared by winding on a heated mandrel the resin impregnated fabric. One tubular member is produced which has an inside diameter of 6⅞ inches, an outside diameter of 7¾ inches and a length of 5⅝ inches. The other or second tubular member produced has an inside diameter of 7¹³⁄₁₆ inches, an outside diameter of 8⁷⁄₃₂ inches, and a length of 1½ inches.

Four discs having a diameter of about 6⅞ inches are cut from the resin impregnated fabric, and a preform approximately 3 inches in diameter and 2 inches in length is prepared from the chopped impregnated fabric of this invention.

Referring to Fig. 2 of the drawing there is shown in cross sectional arrangement the several prepared members prior to being molded under heat and pressure into a high strength spinning bucket. The shorter tubular member 20 is fitted snugly over the bottom of the longer tubular member 22. The four disc members 24 are fitted snugly in the top of the longer tubular member 22. A small amount, about 250 grams, of macerated material 26 is placed on top of the fitted discs 24. The macerated material 26 comprises chopped impregnated fabric of this invention. On top of the macerated material is placed the preform member 28. The arrangement of members is placed in a suitable mold and consolidated under heat and pressure to produce a molded spinning bucket. A pressure of 192 tons in a direction axially of the bucket and heat at a temperature of about 165° C. are applied for 55 minutes for consolidation of the members and to cure the epoxide resin to a thermoset state. The spinning bucket is removed from the mold and machined to desired dimensions and smoothness to produce the finished spinning bucket.

The completed spinning bucket 40 is shown in Fig. 3 of the drawing and comprises a receptacle 42 having a side wall 44 and a bottom wall 46, and a hub portion 48. The hub portion 48 is provided with a socket 50 for receiving a driving spindle. The socket 50 is usually machined in the hub portion after the molding operation is completed.

Two spinning buckets were prepared in accordance with Example VII and both buckets were loaded with 3.75 pounds of lead sheeting. The lead sheeting was placed circumferentially around the inside of the walls of the buckets. These buckets were revolved at increasing speeds until rupture. One bucket ruptured at 14,400 revolutions per minute and the other ruptured at 14,900 revolutions per minute. The load, 3.75 pounds, is 125% of normal maximum rayon wet cake weight and the rupture speed more than 150% the normal operating speed, which is 9,000 revolutions per minute.

To test the resistance to dilute sulfuric acid, six 1 inch x 10 inches x ⅛ inch laminates were prepared from the treated fabric of Examle VII. These six laminates had an average tensile strength of 21,900 p.s.i. prior to immersion in a 15% solution of sulfuric acid. These plates, after immersion in the 15% solution of sulfuric acid at room temperature for 8 months, had an average tensile strength of 21,270 pounds per square inch. This difference is well within the normal range of variations of values on successive tests of the material. Therefore, it can be assumed that the laminate is substantially unaffected by the acid.

It will be understood that the above description and drawing are illustrative and not in limitation of the invention.

I claim as my invention:

1. A highly acid resistant spinning bucket capable of withstanding high stresses in a circumferential direction comprising a plurality of layers of a high strength acid resistant synthetic resin fabric and a thermoset epoxy resin impregnating and bonding the layers of the fabric, said fabric comprising warp of continuous filament yarn and fill of staple yarn, and the layers of the fabric being disposed so that the continuous filament warp fibers are disposed substantially circumferentially of the spinning bucket.

2. A highly acid resistant spinning bucket capable of withstanding high stresses in a circumferential direction comprising a plurality of layers of a high strength acid resistant synthetic resin fabric and a thermoset epoxy resin impregnating and bonding the layers of the fabric, said fabric comprising fibers of at least one synthetic resin selected from the group consisting of polymers of acrylonitrile, copolymers of vinyl chloride and acrylonitrile, and polyethylene terephthalate, said fabric comprising warp of continuous filament yarn and fill of staple yarn, and the layers of the fabric being disposed so that the continuous filament warp fibers are disposed substantially circumferentially of the spinning bucket.

3. A highly acid resistant spinning bucket capable of withstanding high stresses in a circumferential direction comprising a plurality of layers of a high strength acid resistant synthetic resin fabric and a thermoset epoxy resin impregnating and bonding the layers of the fabric, said epoxy resin being employed in an amount equal to from about 1.2 to 1.5 times the dry weight of the fabric and to provide a greenness of from about 12% to 16%, said fabric comprising fibers of at least one synthetic resin selected from the group consisting of polymers of acrylonitrile, copolymers of vinyl chloride and acrylonitrile, and polyethylene terephthalate, said fabric comprising warp of continuous filament yarn and fill of staple yarn, and the layers of the fabric being disposed so that the continuous filament warp fibers are disposed substantially circumferentially of the spinning bucket.

4. A highly acid resistant spinning bucket capable of withstanding high stresses in a circumferential direction comprising a plurality of layers of a high strength acid resistant synthetic resin fabric and a thermoset epoxylated phenolic novolac resin derived from a phenolic novolac and an epihalohydrin impregnating and bonding the layers of the fabric, said expoylated novolac resin being employed in an amount equal to from about 1.2 to 1.5 times the dry weight of the fabric and to provide a greenness of from about 12% to 16%, said fabric comprising fibers of at least one synthetic resin selected from the group consisting of polymers of acrylonitrile, copolymers of vinyl chloride and acrylonitrile, and polyethylene terephthalate, said fabric comprising warp of continuous filament yarn and fill of staple yarn, and the layers of the fabric being disposed so that the continuous filament warp fibers are disposed substantially circumferentially of the spinning bucket.

References Cited in the file of this patent

UNITED STATES PATENTS

| 1,914,273 | Meurling | June 13, 1933 |
| 2,372,983 | Richardson | Apr. 3, 1945 |
| 2,594,693 | Smith | Apr. 29, 1952 |
| 2,650,213 | Hofrichter | Aug. 25, 1953 |

FOREIGN PATENTS

| 630,663 | Great Britain | Oct. 18, 1949 |